2,995,575
Patented Aug. 8, 1961

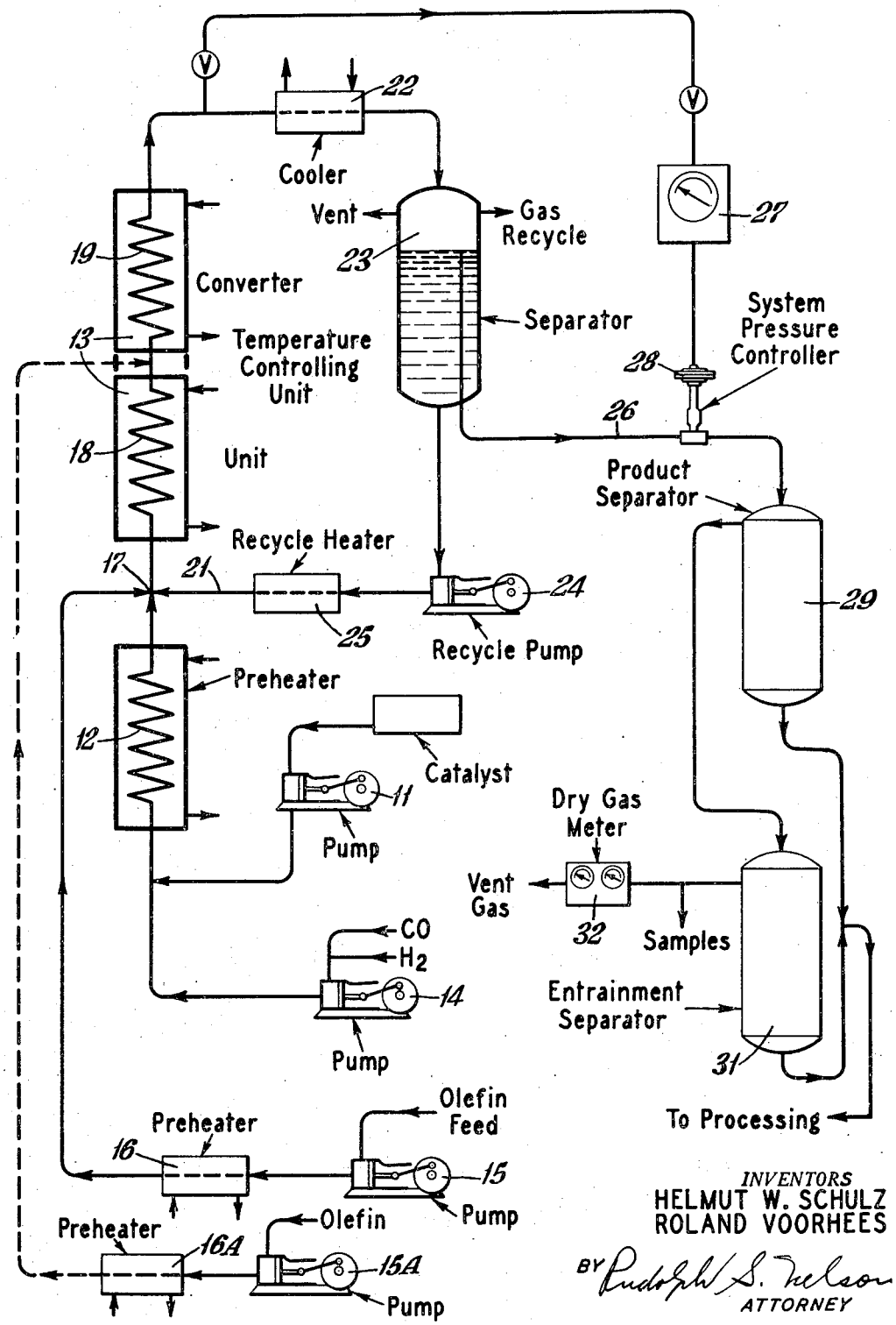

2,995,575
HIGH PRESSURE OXO CONVERSION PROCESS
Helmut W. Schulz, Charleston, W. Va., and Roland Voorhees, Darien, Conn., assignors to Union Carbide Corporation, a corporation of New York
Filed Nov. 30, 1956, Ser. No. 625,442
14 Claims. (Cl. 260—343.5)

The present invention relates to an improved Oxo conversion process for preparing oxygen-containing organic compounds by the reaction of an olefinically unsaturated organic compound with hydrogen and carbon monoxide in the presence of a hydroformylation catalyst. More particularly, this invention is directed to an improved process for the production of aldehydes and alcohols having three or more carbon atoms from olefinically unsaturated organic compounds. In accordance with the present improved process, an olefinically unsaturated organic compound is charged into an extended-length externally cooled reactor having a high length to diameter ratio in the presence of a hydroformylation catalyst, hydrogen, and carbon monoxide. The reacting components are maintained under high pressures and at high linear velocities through the reactor while the exothermic heat of the reaction is removed from the reaction mixture. High productivity rates to the desired aldehydes and alcohols are possible by operation in the manner hereinafter set forth.

It is known that olefinic hydrocarbons can be converted to aldehydes and alcohols having one additional carbon atom by a hydroformylation reaction. This process, generally referred to as an Oxo process, is used to produce saturated aldehydes and alcohols in great quantities, using as the starting materials, olefinic hydrocarbons having 2 to 10 or more carbon atoms and synthesis gas composed of carbon monoxide and hydrogen. Unbranched and branched chain olefins such as ethylene, propylene, butenes, pentenes, styrene, and diolefins, such as butadiene and pentadiene, and the like can be employed in the Oxo process. Oxyhydrocarbons containing olefinic unsaturation such as ethyl acrylate, ethyl crotonate, ethyl sorbate, and the like may also be employed in the Oxo process, depending upon the products desired. By a similar process, generally called a carbonylation reaction, acids and esters are produced from olefins or alcohols by replacing the synthesis gas with carbon monoxide alone or by carbon monoxide and water.

The carbonylation or hydroformylation reaction is generally carried out in conventional pressure vessels, such as tanks or towers, particularly designed to maintain necessary pressures and temperatures of the reaction. In the hydroformylation reaction of some olefinically unsaturated compounds particularly the higher molecular weight olefins having more than five carbon atoms, such as hexenes, heptenes, octenes, nonenes, tripropylene, and like compounds, the chemical reaction rate is quite slow and is the controlling factor of the process. For such reactions, the reaction rate determines the design of equipment and the manner of operation of the process.

In hydroformylation reactions involving the lower molecular weight olefins, such as those having from two to five carbon atoms as ethylene, propylene, butylene, and pentene, and such reactive esters as ethyl acrylate, ethyl crotonate, and ethyl sorbate, the rate of reaction is so rapid that the removal of the exothermic heat from the reaction vessel is the controlling factor rather than the chemical reaction rate. In these reactions, the theoretical energy level of the product is considerably lower than the energy level of the reactants, making it critical that the exothermic heat released in the reaction be removed or the process cannot be adequately controlled. If the temperature of the reaction is permitted to rise too high, methanization of the carbon monoxide or detonation of the olefin is likely to occur, in addition to destroying the reaction products through the formation of aldols, acetals, non-volatile residues, and tars.

These problems are not nearly so critical in reactions of the higher olefins because the differential energy potential between reactants and products is considerably less. For example, it is our experience in hydroformylating of nonenes that only about 400 B.t.u.'s per pound of olefin is liberated. However, with ethylene and propylene, exothermic heats of 2100 B.t.u.'s and 1430 B.t.u.'s respectively per pound of olefin are liberated in the reaction. Thus adequate removal of heat in such reactions must be achieved in order to maintain control over the process and secure high yield of the desired products.

In such reactions of lower olefins and reactive esters, contact time in the reaction zone also becomes critical. The products of such reactions are highly heat sensitive and readily susceptible to the formation of aldols, acetals, polymers, and tars. This problem becomes particularly critical with the reactive esters since both the reactants and products are highly sensitive and readily polymerize into non-volatile residues and tars.

Many methods are presently employed in order to maintain temperature control over the reactions. Perhaps the most commonly employed methods are the slow and controlled addition of the olefinic reactant, and the use of great numbers of cooling tubes in reactors. Although the use of low olefin feed rates will permit satisfactory control of the reaction heat, the productivity of extremely expensive pressure reaction equipment is reduced and there results a process of long contact times and low chemical efficiency to desired primary reaction products.

The use of a recycle of large amounts of the cooled reactant gases or liquid products is a known means of maintaining temperature control in such process, particularly in adiabatic operation. However, with the high heat liberating lower olefins, liquid recycle of product is particularly bad due to long contact time at reaction temperatures, resulting in large amounts of reaction by-products and low yields to desired primary reaction products. In exothermic reactions approaching nearly isothermal conditions, large numbers of cooling tubes providing high heat transfer area in the reactor are often the only practical means of maintaining control over the reaction temperature. The presence of such cooling tubes in the reactor occupies such a large volume of the reactor space that the volume of reaction is seriously limited and corresponding low productivity rates achieved. Heat transfer coefficients to such tubes in a relatively slow moving fluid system is generally poor, necessitating the use of large heat transfer surfaces. In addition, the construction of such equipment is complicated and extremely expensive in relation to the production capacity of the equipment. It is, for example, common in the conversion of ethylene to propionaldehyde in a tank or pot converter to have a productivity of about 25–35 pounds of product per hour per cubic foot of reactor space. In such a system about 50 pounds per hour per cubic foot of reactor volume is deemed to be the maximum productivity which can be obtained in any modified tank type converter containing internal cooling coils.

It is, therefore, an object of the present invention to provide an improved Oxo process which will enable greater productivities per volume of reactor than heretofore experienced in the Oxo process, and which can be constructed and operated at substantially reduced costs. This savings in equipment costs becomes of increased significance in systems designed for high pressures, such as at 4000–6000 p.s.i. or more.

It is a further object of the present invention to provide a process for the hydroformylation of olefinic compounds at a productivity rate as high as five to ten times the productivity experienced in existing art, securing in the system high through-put rates, adequate temperature control, and excellent chemical efficiencies to desired products, which process is particularly applicable to the reaction of lower olefins and reactive olefin esters.

According to the present invention, we have now discovered an improved Oxo process which can secure these above objects. Our improvement includes the steps of preheating the mixture of hydrogen, carbon monoxide, and the hydroformylation catalyst to the desired reaction temperature before adding the olefinic reactant, preheating the olefinic reactant to about the same temperature as the preheated mixture and mixing the two preheated streams. The resultant mixture is then conducted through an externally cooled reactor having a high length to diameter ratio at a rate such that turbulent flow is created at a total olefin residence time in the reactor of less than 10 minutes. We have found that in operating in the hereinafter described manner, piston type flow through the reactor is possible, eliminating any back-mixing and reducing post-hydrogenation and aldolization.

By our improvement, productivity rates of the saturated oxygen-containing product of at least 100 pounds, and generally between about 200 to 600 pounds of product per hour per cubic foot of reactor volume are possible at olefin conversion rates of 80 to 90 percent.

The use of an extended length reactor with its high linear velocity and excellent heat removal capacity at turbulent flow is adaptable through this process to both hydroformylation and carbonylation reactions of olefinic organic compounds. It has particular advantage in reactions producing rapid evolution of exothermic heats of reaction, for example in the hydroformylation of lower olefinic hydrocarbons such as ethylene, propylene, butenes, and propenes; and lower alkyl esters of olefinic acids such as ethyl acrylate, ethyl crotonate, ethyl sorbate, allyl crotonate, and the like. It can also be used for the carbonylation of alcohols to esters such as the conversion of methanol to methyl acrylate and acetic acids, and for the conversion of olefins to acids and anhydrides. It is particularly surprising that such high throughputs and productivities can be obtained with the highly exothermic reactions of the lower olefinic hydrocarbons while maintaining temperature control over the reaction and securing high conversion efficiencies. Likewise, this process also has the surprising advantage of permitting the production of heat-sensitive compounds from other thermally reactive materials without resinification, tar formation, or decomposition as would normally occur in the hydroformylation of the lower alkyl esters of unsaturated acids. The process, we have found, also serves to minimize post-hydrogenation and aldolization of the primary reaction products through short contact times and piston-type flow through the reactor preventing back-mixing and degradation of products.

The hydroformylation reaction proceeds in the reactor in a liquid medium which acts as a solvent or suspendant for the actual hydroformylation catalyst, reported to be the carbonyl or hydrocarbonyl of the active metal, and presumably serves as a solvent for the olefin to be hydroformylated. The presence of between about 5 and 50 percent liquid in the reaction mixture is necessary for high productivity in this process. This liquid medium is not, however, restricted to a certain class of compounds. It can be a catalyst suspendant, such as glycol, ether, ester, alcohol, or liquid hydrocarbon, such as benzene, toluene, and mineral oil, and liquid olefins, or reaction products such as crude products, or products after stripping off low-boiling fractions. We have found it to be particularly advantageous in this process to use the catalyst suspended in the reaction product or process residue as this provides the required liquid reaction medium without introducing any extraneous compounds into the crude product.

In many cases, for instance in the hydroformylation of lower olefins to aldehydes, process conditions can be balanced so that high efficiencies and temperature control are achieved in a single-pass. This is particularly true of the lower olefinic hydrocarbons such as ethylene and propylene where single-pass conversion of as high as 80–95 percent are possible in this process. However, in the use of other olefinic reactants having a lower rate of hydroformylation, and which would otherwise require residence times in the reactor of more than 10 minutes, excellent results are obtained at lower conversion rates at shorter residence times by recycle of a portion of the liquid products under full system pressure and temperature. Employing recycle of part of these liquid products, high ultimate conversions, high linear velocity of fluid flow, and high heat transfer rates are secured. The higher heat transfer rates achieved with additional liquid in the reaction, in cooperation with the reduced heat liberation from lower single pass conversions, permits excellent control over the reaction at high throughput rates. When operating under recycle conditions, we prefer to recycle no more than 50 percent of the liquid products, and more preferably between about 5 and 50 percent. Recycle of liquid products further serves to increase the concentration of active catalyst and improve the per pass conversion.

Recycle of liquid products can advantageously be employed even with the lower olefins in the highly exothermic hydroformylations, particularly with the conversion of propylene to butyraldehyde. In this case the butyraldehyde is quite stable at the reaction conditions so that there is little hydrogenation and aldolization to by-products, and greater productivities are made possible by the faster reaction. Productivities of as high as 500 pounds per cubic foot per hour of liquid products are possible employing a 50 percent recycle. A liquid recycle is not quite as advantageous in the hydroformylation of ethylene to propionaldehyde as the product is not as stable to reaction conditions as is butyraldehyde. In this case, it is desirable to employ propanol as the liquid reaction media.

Recycle of liquid products, to be most effective, should be at full system pressure and at reaction temperature. Heat removal by way of sensible heat transfer through the use of cold liquid recycle is not desirable, in that it serves to temporarily quench the reaction at the point of addition of recycle liquid and thus lowers yield and chemical efficiencies to the desired products. Recycle under full system pressure is desirable to minimize any upset of reaction conditions and prevent decomposition of the contained active catalyst.

In the operation of this process, it is necessary to heat the mixture of hydrogen, carbon monoxide, and catalyst to a temperature between 140° C.–250° C. before the addition of the olefinic reactant. The reaction temperature best suited to the process is normally determined by the physical design of the equipment, heat removal capacity of the system, the olefinic reactant employed, the operating pressure, and the desired products. For most hydroformylation reactions, temperatures of about 150° C. to 220° C. are preferred for best yields and conversion efficiencies. The heating of the mixture can be conducted in a separate preheater or in a preheater section as an integral part of the elongated reactor at a point before the olefinic reactant addition. This mixture must be at the operating pressure of the system which can be between about 3000 p.s.i. to about 15,000 p.s.i., with pressures between about 4000 p.s.i. and 6000 p.s.i. particularly preferred for most reactions.

The molar ratio of hydrogen to carbon monoxide in the synthesis gas employed in this process can range from about 1 to 1 to about 3 to 1, depending primarily on the reaction to be carried out, the primary product produced and the unsaturated reactant employed. In hydroformylation reactions securing predominantly aldehyde products, a molar ratio of less than about two moles of hydrogen per mole of carbon monoxide is preferred.

This minimizes hydrogenation of the olefin prior to hydroformylation and also reduces the tendency to hydrogenate the aldehyde product after hydroformylation. Best results are secured employing a molar ratio in the synthesis gas of about one to one.

By permitting the mixture of hydrogen, carbon monoxide, and hydroformylation catalyst to reach operation temperature before adding the olefinic reactant, by-product formation is retarded and hydrogenation of the olefin reactant is reduced. This also results in greater ease of control over the reaction.

The olefinic reactant employed in the process is heated to about the predetermined reaction temperature in a separate preheater under operating pressure, and then is mixed with the preheated mixture of hydrogen, carbon monoxide, and catalyst at operating pressure. It is necessary in the operation of the process that the olefinic reactant be added at a rate of no greater than in equimolar amounts to the amount of carbon monoxide in the mixture at the point of addition. It is preferred that the amount of carbon monoxide exceed the amount of olefinic reactant by at least 10 mole percent at the point of mixing where olefinic reactant is added at only one point. The higher synthesis gas to olefinic reactant ratio aids in increasing the linear velocity in the reactor with a consequential improvement in heat transfer rate.

The addition of the olefinic reactant can be at one location in the reactor, or if desired, it can be at spaced intervals along the reactor. It has been found to be of particular advantage to provide such multiple points for addition of the olefinic reactant along the reactor. In this manner, excessive localized reaction or "hot spots" in the reactor can be avoided, securing excellent conversion efficiencies and preventing deactivation and decomposition of the hydroformylation catalyst in the reactor. Preferably, the multiple points of addition are spaced to occur in intervals spaced such that the reaction temperature does not vary more than 30° C. through the reactor. For best operation, these multiple points of addition should be in the first two-thirds of the reactor.

Known hydroformylation and carbonylation catalysts are employed in our process, with cobalt-containing catalysts being preferred. The cobalt catalysts can be either in the insoluble form such as cobalt metal, cobalt oxide, cobalt carbonate, or insoluble cobalt salts, such as cobalt acetate, which are introduced in slurry form or as the soluble cobalt salts such as cobalt carbonyl or hydrocarbonyl, cobalt naphthenate, stearate, or 2-ethyl-hexanoate, and like forms, introduced in solution of a hydrocarbon or oxygen-containing organic solvent such as alcohols, esters, ethers, and the like, or aqueous solutions of cobalt salts, such as cobalt formate, cobalt acetate, and the like.

In this process, catalysts can be employed in amounts ranging from about 0.05 to about 5.0 parts by weight per hundred parts of feed olefin. We prefer the use of about 0.1 to about 1.5 parts of catalyst per hundred parts of feed olefin. Such amounts have been found to provide excellent conversion rates at high productivity levels with low molecular weight olefins such as ethylene and propylene. Higher amounts of catalyst may be desired to permit a reduction in operating temperature and to reduce losses due to hydrogenation of the olefin.

It is critical in the operation of this process that the olefin be exposed to reaction conditions for a minimum length of time to prevent aldolization, hydrogenation, and polymerization of the product. The total contact time must be less than 10 minutes, and preferably should be between about 1 to 5 minutes. Since the contact time is a function of the length of reactor and the linear velocity of reactants, either factor can be so adjusted as to provide the desired contact time.

According to our experience, it is necessary in the practice of this invention to secure the high productivity and conversions for the reactor to have a high length to diameter ratio, such as about 2000 to 1 and above. The use of reactors having a length to diameter ratio of less than this will not provided sufficient heat transfer area to remove the exothermic heat of reaction at high productivity levels or provide sufficient contact time at the high linear velocities required for good heat transfer to give satisfactory conversions. By having such a high ratio of length to diameter, nearly isothermal operation can be insured despite a high rate of heat release.

The reactor employed in this process must be externally cooled to provide for removal of the exothermic heat. This can be accomplished by jacketing the reactor tube in one or several sections or by arranging the reactor tube in the form of a coil or bundle contained in a vessel in which the cooling fluid surrounds the tube. We have found it to be advantageous to maintain a nearly constant reaction temperature throughout the reactor. This can be conveniently accomplished by having the cooling zone divided into sections with coolants independently controlled at different temperatures in the several sections. Localized overheating is also prevented by having the coolant in the section where the greatest portion of the reaction occurs, maintained at a lower temperature than the coolants in the other sections.

While the maintenance of a nearly constant reaction temperature throughout the entire length of the reactor is desired, it is possible in this process to have a temperature variation of 25° C.–30° C. through the reactor without serious hindrance to the effectiveness of the process, that is, without methanization and catalyst decomposition in the reactor and without great changes in productivity and conversion efficiency. In hydroformylation reactions, for example, temperature variation within the reactor becomes a problem only when operating temperatures approach 235° C.–250° C. conducted under pressures of 4000–6000 p.s.i. At such temperatures, catalyst decomposition can result. According to our experience, at temperatures above about 250° C. the hydroformylation reaction cannot proceed and hydrogenation of the olefin or methanization of carbon monoxide readily occurs.

We have found that high-pressure tubing, of a size of about ¼″ to about 3″ I.D. in a length of about 200 to 2000 feet will conveniently serve as the reactor in our process although shorter or longer lengths can be used, depending upon the heat transfer area required and the maximum residence time in the reactor. The tubing can be arranged in any convenient manner to secure the desired length, for instance, in coils, banks of tubes, or in one straight section.

The linear velocity of the reaction mixture through the reactor is dependent upon the reaction temperature and reactants employed. The linear velocity should be such that full turbulent flow is obtained and total residence time in the reactor is less than 10 minutes. Turbulent flow with the corresponding high heat transfer coefficients permits the removal of the exothermic heat throughout the length of the reactor, without over-heating within. Since the rate of olefin feed is governed by the heat removal capacity of the system, these high heat transfer coefficients are necessary for proper operation of this process. For this purpose, recycle of part of the liquid products or a high ratio of synthesis gas to olefinic reactants serves effectively as an inert diluent for the reaction so that a high linear velocity in the reactor is achieved. The necessary linear velocity in such an exothermic system is thus determined by the heat removal capacity of the equipment as governed by the heat transfer rate, surface area, coolant temperature, rate of heat release, and allowable pressure drop. Linear velocity in operation at the higher temperature preferably should be such as to prevent a fluctuation of greater than about 25° C–30° C. throughout the reactor.

It will assist in understanding this invention to refer to the accompanying drawing. FIGURE 1 represents one of the preferred methods of operating our process in a hydroformylation reaction.

In this drawing we have shown the catalyst in dissolved or slurried form being pumped by pump 11 into the preheater tube 12 where it is heated to the desired reaction temperature along with the synthesis gas pumped by pump 14. Preheater tube 12 shown is wound in a helical coil in the preheater in order to obtain sufficient linear length of tube to effect the heating to the reaction temperature of the catalyst mixture and synthesis gas. The olefinic reactant feed is pumped by pump 15 through preheater 16 to also raise it to reaction temperature. At point 17 the catalyst and synthesis gas streams mix with recycle of liquid products 21 if such are employed. The reaction mixture flows through helical converter coils 18 and 19 encased in coolant jackets 13. Shown also is the possible introduction, if desired, of additional olefinic reactant feed to the system between units 18 and 19 by pump 15A through preheater 16A.

The preheating unit 12 for the hydrogen, carbon monoxide, and catalyst mixture is maintained at the predetermined reaction temperature, between about 140° C.–250° C., as are the converter units 18 and 19. Coolant temperatures in reactor jackets 13 are maintained by separate temperature controlling units at levels not necessarily identical, such that the reaction temperature does not reach levels detrimental to reaction efficiency, i.e. above the range of about 235° C.–250° C. After leaving the converter, the reaction mixture is cooled in cooler 22 and fed to the separator 23. Here the liquid products are separated from the gaseous portion, i.e., unreacted gases and gaseous products. Unreacted gases can be recycled in the system or vented as desired. A portion of the liquid product 21 containing active catalyst can be recycled by pump 24 back through recycle heater 25 to heat it to reaction temperature to avoid quenching the system. The recycle stream is added back to the converter at 17. The remainder of the liquid products are withdrawn from the separator 23 and through line 26. The pressure in the system is maintained preferably at about 4000–6000 p.s.i., by the back-pressure controller 27 which operates regulating valve 28. The liquid products then pass to product separator tank 29 maintained at about atmospheric pressure. Gases from tank 29 are freed of any entrainment in tank 31 and all gases present vented to the atmosphere, preferably through a meter 32. Main products are removed from the bottom of tank 29. The entrainment products are removed from the bottom of tank 31 and combined with products from tank 29 for processing.

The following examples are illustrative.

*Example 1*

Using the process described for FIGURE 1, cobaltous acetate catalyst was slurried in mineral oil (45 grams per gallon of mineral oil) and pumped by pump 11 at a rate of about 1600 cc. per hour (0.26 percent by weight of cobalt acetate of propylene feed) through preheating section 12. Carbon monoxide and hydrogen were mixed in a molar ratio of 1.13 to 1 and compressed by pump 14 to about 6000 p.s.i. pressure and fed at a rate of about 8500 liters per hour through the preheater section maintained at 203° C. The preheater consisted of 30 feet of 5/16″ I.D.–9/16″ O.D. type 18–8 stainless steel tubing in a coil. Propylene having a purity of about 82 percent was pumped as a liquid at a rate of about 13,600 cc. per hour by pump 15, and added to the reactor after the preheater section and before the converter section. The converter section of the reactor consisted of 60 feet of the same tubing in two coils, each containing 30 feet of tubing. This amounted to a reactor volume of 0.84 liter.

Fifty percent of the liquid products (5500 cc. per hour) were recycled in the process under full system pressure by heating them in preheater 25 to the reaction temperature, 203° C., and adding at point 17. Space velocity in the reactor was 4100 v./v./hr., corresponding to a total residence time in the reactor of 2.2 minutes.

Converter jacket temperature was controlled at 209° C. Gas ratio of $H_2:CO:C_3H_6$ was maintained at 1.0:1·13:1.0 during the run. The pressure in the converter was kept at 6000 p.s.i. All products from the converter were fed to cooler 22 to condense the liquids which were collected in separator 23. The run was continued for nine hours under these conditions.

Liquid products were taken from vessel 29 and analyzed. A productivity of total liquid products of 565 pounds of liquid products per cubic foot of reactor per hour was achieved with a propylene conversion of 86.5 percent. Efficiencies, based on propylene reacted were: 76.0% to butyraldehyde, 4.2% to butanol, 12.6% to propane, and 7.1% to other liquid products.

*Example 2*

This example was conducted in the same manner as Example 1 except using a molar gas ratio of $H_2:CO:C_3H_6$ of 1.3:1·4:1.0 and a converter temperature of 208° C. Space velocity in the reactor was 3900 v./v./hr., corresponding to a total residence time in the reactor of 2.0 minutes. The run was conducted under these conditions for nine hours.

Productivity to total liquid products was 475 pounds of liquid products per cubic foot of reactor per hour at a propylene conversion of 73.0 percent. Chemical efficiencies based on propylene reacted were 80.1% to butyraldehyde, 3.1% to butanol, 11.3% to propane, and 5.6% to other liquid products.

*Example 3*

This example was conducted in the same manner as in Example 1 using a mole ratio of $H_2:CO:C_3H_6$ of 1.07:1.07:1.0 at a converter temperature of 208° C. Space velocity in the reactor was 4570 v./v./hr., corresponding to a total residence time in the reactor of 1.5 minutes. In this example the 50 percent liquid products recycle was first expanded to atmospheric pressure before being recycled. It was recompressed to operating pressure and reheated to reaction temperature before being added at point 17. The run was continued under these conditions for nine hours.

Productivity was 364 pounds of liquid products per cubic foot of reactor per hour at a propylene conversion of 52.2 percent. Efficiencies were 67.4% to butyraldehyde, 6.8% to butanol, 18.1% to propane, and 7.4% to other liquid products. Comparison of this example with Example 1 illustrates the advantage to be secured in productivity and conversion efficiency to primary reaction product by recycle of part of liquid products under full system pressure and temperature.

*Example 4*

This example was conducted in the same manner as Example 3 using a mole ratio of $H_2:CO:C_3H_6$ of 1.1:1.1:1.0 at a converter temperature of 211° C. Space velocity in the reactor was 4050 v./v./hr., corresponding to a total residence time in the reactor of 1.7 minutes. Butanol was used as the catalyst suspension agent in this example instead of mineral oil. Liquid products recycle was only 25 percent of total liquid products. The run was continued under these conditions for nine hours.

Productivity was 362 pounds of liquid products per cubic foot of reactor per hour at a propylene conversion of 65.4 percent. Efficiencies were 68.8% to butyraldehyde, 1.2% to butanol, 26.6% to propane, and 3.5% to other liquid products. This example demonstrates that slightly lower productivities are secured when recycle is cut to 25 percent of liquid products.

*Example 5*

This example was conducted in the same manner as Example 4 using a mole ratio of $H_2:CO:C_3H_6$ of 1.1:1.1:1.0 at a space velocity of 3090 v./v./hr. corresponding to a total residence time in the reactor of 2.4 minutes. The run was conducted under these conditions for seven hours. No liquid products were recycled and productivity was 271 pounds of liquid products per cubic foot of reactor per hour at a propylene conversion of 57.1 percent. Liquid products analyzed as 61.8% butyraldehyde, 0.0% butanol, 34.6% propane, and 3.6% other liquid products.

This example, compared to the previous examples, demonstrates the beneficial use of recycle of part of the liquid products. However, it should be remembered that productivity in this example is still 5 to 8 times higher than that which can be achieved by standard tank and pot type converters.

*Example 6*

Using the process described for FIGURE 1, cobaltous acetate was slurried in 1-propanol (45 grams per gallon of propanol) and pumped by pump 11 at a rate of 1600 cc. per hour through preheating section 12. Carbon monoxide and hydrogen were mixed in a mole ratio of 1:1 and pumped through the preheater at a rate sufficient to give a 1.2:1.2:1 ratio of $H_2$:CO:olefin at point of olefin injection 17. Eethylene was pumped at a liquid rate of 7200 cc. per hour through preheater 16 and joined with the preheated synthesis gas, propanol, and catalyst mixture at 17. The concentration of ethylene in the mixture entering the converter was 27.5 mole percent. The converters 18 and 19 consisted of a coil of 75 feet of 3/16-inch I.D. by 9/16-inch O.D., 18–8 stainless steel tubing. Temperature control was obtained by circulating heat transfer fluid at 185° C. through a jacket. The olefin pumping rate was such that an ethylene space velocity of 5100 v./v./hr. was obtained which corresponded to a total residence time in the reactor of 1.2 minutes. The pressure was maintained at 4500 p.s.i. by back pressure controller 27 operating regulating valve 28. All products from the reactor were fed through cooler 22 and into separator 23. No liquid recycle was used in this experiment. Liquid and gaseous products were expanded to atmospheric pressure through motor valve 28 into separator tanks 29 and 31. The unreacted gases were metered and vented. Samples of liquid and gaseous products were analyzed and conversion, yield, efficiency, and productivity data calculated. The run was conducted under these conditions for seven hours.

Productivities of total liquid products and to propionaldehyde were 468 and 434 pounds respectively per hour per cubic foot of reactor volume. Conversion of ethylene was 69.8 percent. Chemical efficiencies, based on ethylene reacted, were 81.4% to propionaldehyde, 12.0% to ethane, 0.8% to propyl formate, 5.8% to steam distillable by-products, i.e. aldols and acetals. This experiment demonstrates productivities of 10 to 20 times those possible in the more conventional tank-type of reactor in single pass conversion.

*Example 7*

This example was conducted in the same manner as Example 6 except that two 75 foot coils of 3/16-inch I.D. by 9/16-inch O.D. tubing in series were used in place of the single 75 foot coil for the reactor. Synthesis gas, a 1:1 mole ratio of hydrogen and carbon monoxide, and ethylene were fed at rates sufficient to give an ethylene space velocity of 2200 v./v./hr. in the reactor and an ethylene concentration of 24.6 percent entering the converter. Total residence time in the reactor was 4.4 minutes. Cobalt acetate catalyst was again fed as a slurry in 1-propanol carrier at a rate sufficient to give 0.0088 pound of cobalt acetate per pound of ethylene entering the reactor. No liquid recycle was employed in this example. The run was conducted under these conditions for eight hours.

Productivities to total liquid products and to propionaldehyde of 278 and 263 pounds respectively per hour per cubic foot of reactor volume were achieved. Conversion of ethylene was 89 percent with efficiencies of 90.1% to propionaldehyde, 5.6% to ethane, 0.6% to propyl formate, 3.7% to steam distillable by-products.

This experiment demonstrates the high efficiencies to primary reaction product (propionaldehyde) obtainable with low loss to degradation or condensation products. Decreased efficiency losses to ethane and by-products in this experiment compared to Example 6 are attributed to lower temperatures in the reaction zone due to reduced heat load at the reduced space velocity. By proper balance between olefin throughput and heat removal ability, both high productivity and high efficiencies can be maintained simultaneously.

*Example 8*

This example was conducted in the same equipment and manner as Example 7. Synthesis gas, a 1:1 mole ratio of hydrogen to carbon monoxide, and ethylene were fed at a rate sufficient to give an ethylene space velocity of 2530 v./v./hr. in the reactor and an ethylene concentration of 29 percent. Total residence time in the reaction was 4.4 minutes. Cobalt acetate in a slurry of 1-propanol was fed at a rate sufficient to give 0.0092 of cobalt acetate per pound of ethylene. Fifty percent of the liquid products were recycled back to the point of olefin addition under full system temperature and pressure. The run was conducted under these conditions for 9.0 hours.

Productivities to total liquid products and to propionaldehyde of 294 and 194 pounds, respectively, per hour per cubic foot of converter were achieved. Conversion of inlet ethylene was 90 percent, with efficiencies of 57.0% to propionaldehyde, 13.3% to ethane, 3.7% to propanol, 2.1% to propyl formate, and 23.9% to usable steam-distillable by-products.

*Example 9*

This example was conducted in the same manner as Example 7, employing no recycle of liquid products. Synthesis gas, a 1:1 mole ratio of hydrogen to carbon monoxide and ethylene were fed at a rate sufficient to give an ethylene space velocity of 2500 v./v./hr. in the reactor and an ethylene concentration of 26 percent. Total residence time in the reactor was 2.8 minutes. Cobalt acetate in a slurry in 1-propanol was fed at a rate sufficient to give 0.0037 pound of cobalt acetate per pound of ethylene. The run was conducted under these conditions for seven hours.

Productivities to total liquid products and to propionaldehyde of 338 and 311 pounds, respectively, per hour per cubic foot of converter were achieved. Conversion of inlet ethylene was 95.1%, with efficiencies of 87.3% to propionaldehyde, 5.1% to ethane, 1.9% to propyl formate, and 5.7% to usable steam distillable by-products.

*Example 10*

This example was conducted in the same manner as Example 9 except that 50 percent of the liquid products were recycled back to the point of olefin feed. Synthesis gas, a 1:1 mole ratio of hydrogen to carbon monoxide and ethylene were fed at a rate sufficient to give an ethylene space velocity of 2600 v./v./hr., in the reactor and an ethylene concentration of 29 percent. Total residence time in the reaction was 3.4 minutes. Cobalt acetate in a slurry in isopropanol was fed at a rate sufficient to give 0.0083 pound of cobalt acetate per pound of ethylene. The run was conducted under these conditions for 8.0 hours.

Productivities to total liquid products and to propionaldehyde of 296 and 215 pounds, respectively, per hour per cubic foot of converter were achieved. Conversion of inlet ethylene was 79.0% with efficiencies of 68.6% to propionaldehyde, 5.7% to ethane, 3.1% to propanol and 19.2% to usable steam-distillable by-products.

Example 11

Ethyl crotonate containing 0.25 percent by weight cobalt acetate was fed with synthesis gas having a 1:1 mole ratio of hydrogen to carbon monoxide through a preheater held at 180° C. into the reactor described in Example 1 (120 feet of 5/16-inch I.D. by 9/16-inch O.D. stainless steel tubing). A feed rate sufficient to give a liquid space velocity in the converter of 12.0 reciprocal hours was employed, which corresponds to a total residence time in the reactor of 4.5 minutes. The reactor jacket was maintained at 180° C. and the pressure in the converter at 4500 p.s.i. The ratio of $CO:H_2$:ethyl crotonate was 1.3:1.3:1. No liquid recycle was used in this experiment. All products from the converter were fed through a cooler, then expanded to atmospheric pressure and collected. The run was conducted under these conditions for three hours.

The productivity to ethyl 4-formyl butyrate plus delta valerolactone was 462 pounds per hour per cubic foot of converter (2.7 parts by weight of ethyl 4-formyl butyrate per part of delta valerolactone). The conversion of the ethyl crotonate fed was 89 percent. Efficiency to the desired hydroformylation products (ethyl 4-formyl butyrate plus delta valeolactone) was 65% to hydrogenated feed product (ethyl butyrate) was 20%, to residues was 15%.

This experiment demonstrates the utility of the tubular conversion system for processing thermally sensitive olefinic reactants and products.

We claim:

1. In a process for the hydroformylation of olefinic organic compounds to form reaction products containing at least one more carbon atom than said compound, the improvement which comprises the steps of heating a mixture of hydrogen, carbon monoxide, and a cobalt-containing hydroformylation catalyst to a predetermined temperature between about 140° C. and 250° C., adding an olefinic organic compound which is a member selected from the group consisting of olefinic hydrocarbons containing from two to ten carbon atoms and lower alkyl esters of olefinically unsaturated acids, said acids containing from two to ten carbon atoms, separately preheated to about the said predetermined temperature, in an amount of no greater than in equimolar proportions to the carbon monoxide present in said mixture, conducting the resulant mixture of olefinic compound, hydrogen, carbon monoxide, and catalyst in the presence of a liquid reaction medium inert to said mixture through an externally cooled reactor having a length to diameter ratio of at least 2000 to 1 at a rate such that turbulent flow conditions are achieved in the reactor with a total residence time of the said mixture in the reactor of no more than 10 minutes, said externally cooled reactor maintained at a temperature between about 140° C. and 250° C. and at operating pressures between the range of about 3000 p.s.i. to about 15,000 p.s.i, while maintaining the external cooling of said reactor as to secure substantially isothermal reaction conditions and securing a productivity thereby of at least 100 pounds of liquid reaction products per hour per cubic foot of reactor volume 2. A process according to claim 1 wherein the olefinic organic compound is an olefinic hydrocarbon having no more than five carbon atoms.

3. A process according to claim 1 wherein the olefinic organic compound is a lower alkyl ester of an olefinically unsaturated acid.

4. A process according to claim 1 wherein the olefinic organic compound is added at spaced intervals along the reactor, said intervals spaced such that the reaction temperature in any interval does not vary by more than 30° C. from the temperature at any location in the reactor.

5. A process according to claim 1 wherein the liquid reaction products from the reactor are separated from the effluent mixture and up to 50 percent by weight of said liquid reaction products are recycled at reaction temperature and pressure to the reactor at about the point of initial addition of the olefin.

6. A process according to claim 1 wherein the olefin is added at spaced intervals along the reactor, said intervals having individually controlled temperature controlling jackets such that the reaction temperature at any interval does not vary by more than 30° C. from the temperature at any location in the reactor.

7. In a process for the hydroformylation of olefinic hydrocarbons to form reaction products containing at least one more carbon atom than said hydrocarbon, the improvement which comprises the steps of heating a mixture of hydrogen, carbon monoxide, and a cobalt-containing hydroformylation catalyst in which hydrogen is present in amounts of no greater than two moles per mole of carbon monoxide, to a predetermined temperature between about 150° C. and 220° C., adding an olefinic hydrocarbon containing from two to ten carbon atoms separately preheated to about the said predetermined temperature, in amounts of no greater than in equimolar proportions to the carbon monoxide present in the said mixture, conducting the resultant mixture of olefin, carbon monoxide, hydrogen, and cobalt-containing catalyst in the presence of a liquid reaction medium inert to said mixture through an externally cooled reactor having a length to diameter ratio of at least 2000 to 1 at a rate such that turbulent flow conditions are achieved in the reactor with a total residence time of the said mixture in the reactor of no more than 10 minutes, said externally cooled reactor maintained at a temperature between about 170° C. and 220° C. and at operating pressures between about 4000 to 6000 p.s.i., separating liquid reaction products from the resultant effluent mixture of the said reactor, and recycling up to 50 percent of said liquid reaction products at reaction temperature and pressure to the point of initial olefin addition and securing a productivity thereby of at least 100 pounds of liquid reaction products per hour per cubic foot of reactor volume.

8. A process according to claim 7 wherein the olefinic hydrocarbon is a lower molecular weight olefinic hydrocarbon having no more than 5 carbon atoms.

9. A process according to claim 7 wherein the olefinic hydrocarbon is ethylene.

10. A process according to claim 7 wherein the olefinic hydrocarbon is propylene.

11. A process according to claim 7 wherein the olefinic hydrocarbon is butylene.

12. A process according to claim 7 wherein the olefin is added at spaced intervals along the reactor, said intervals spaced such that the reaction temperature at any interval does not exceed by more than 30° C. the temperature at any location in the reactor.

13. In a process for the hydroformylation of a lower alkyl ester of an olefinically unsaturated acid to form the lower alkyl ester of a formyl substituted alkanoic acid, the improvement which comprises the steps of heating a mixture of hydrogen, carbon monoxide, and a cobalt-containing hydroformylation catalyst in which hydrogen is present in amounts of no greater than two moles per mole of carbon monoxide, to a predetermined temperature between about 150° C. and 220° C., adding a lower alkyl ester of an olefinically unsaturated acid, said acid containing from two to ten carbon atoms, separately preheated to about the said predetermined temperature, in amounts of no greater than in equimolar proportions to the carbon monoxide present in the said mixture, conducting the resultant mixture of the said olefinic acid ester, carbon monoxide, hydrogen, and cobalt-containing catalyst in the presence of a liquid reaction medium inert to said mixture through an externally cooled reactor having a length to diameter ratio of at least 2000 to 1 at a rate such that turbulent flow conditions are achieved in the reactor with a total residence time of the said mixture in the reactor of no more than 10 minutes, said externally cooled reactor maintained at a temperature between about 170° C. and 220° C. and an operating pressure between about 4000 and 6000 p.s.i., separating liquid reaction products from the resultant effluent mixture of the said reactor and securing a productivity thereby of at least 100 pounds of liquid reaction products per hour per cubic foot of reactor volume.

14. A process according to claim 13 wherein the lower alkyl ester of the olefinically unsaturated acid is ethyl crotonate.

References Cited in the file of this patent

UNITED STATES PATENTS

| | | |
|---|---|---|
| 2,440,109 | Moore | Feb. 6, 1945 |
| 2,497,303 | Gresham et al. | Feb. 14, 1950 |
| 2,504,682 | Harlan | Apr. 18, 1950 |
| 2,517,383 | Brooks | Aug. 1, 1950 |
| 2,557,701 | Smith | June 19, 1951 |
| 2,587,858 | Keulemans | Mar. 4, 1952 |
| 2,610,203 | Hagemeyer et al. | Sept. 9, 1952 |
| 2,734,922 | Gwynn et al. | Feb. 14, 1956 |
| 2,748,168 | Gwynn | May 29, 1956 |
| 2,778,859 | Johnson et al. | Jan. 22, 1957 |
| 2,779,795 | Gwynn | Jan. 29, 1957 |
| 2,802,843 | Tramm et al. | Aug. 13, 1957 |

FOREIGN PATENTS

| | | |
|---|---|---|
| 702,224 | Great Britain | Jan. 13, 1954 |

OTHER REFERENCES

Holm et al.: Fiat Final Report No. 1000: "The OXO Process" (PB–81383, Dec. 26, 1947; pages 17–19).

I. G. Farben patent application I 74,142 IV d/120, available as Meyer Translation (PB–71337) P C–S–V, pages 68 and 69; Chas. A. Meyer Co., N.Y., 1948; Tom Reel 36, item 21 and part of item 36.

Hoog: Proc. 3rd World Petrol. Congress, section V, pages 11, 15, 17 and 18 (1951).